United States Patent [19]

Jackson, Jr. et al.

[11] Patent Number: 4,507,256

[45] Date of Patent: Mar. 26, 1985

[54] PROCESS FOR FOAMING CELLULOSE ACETATE ROD

[75] Inventors: Winston J. Jackson, Jr., Kingsport, Tenn.; William R. Darnell, Weber City, Va.

[73] Assignee: Eastman Kodak Company, Rochester, N.Y.

[21] Appl. No.: 498,444

[22] Filed: May 26, 1983

[51] Int. Cl.$^3$ ............................................. B29D 27/00
[52] U.S. Cl. ..................................... 264/54; 264/45.5; 264/DIG. 5; 264/DIG. 13; 521/90; 525/433; 528/370
[58] Field of Search ................... 264/54, DIG. 5, 45.5, 264/DIG. 13; 521/90; 528/370; 525/433

[56] References Cited

U.S. PATENT DOCUMENTS

| | | | |
|---|---|---|---|
| 2,085,047 | 6/1937 | Schneider | 264/54 X |
| 2,628,945 | 2/1953 | Wayne | 521/90 |
| 3,574,803 | 4/1971 | Allen et al. | 264/50 |
| 3,939,849 | 2/1976 | Baxter et al. | 264/53 X |
| 3,962,154 | 6/1976 | Egli | 264/DIG. 5 |
| 3,969,551 | 7/1976 | Ellsworth | 427/282 |
| 4,016,814 | 4/1977 | Schank et al. | 427/262 X |
| 4,054,550 | 10/1977 | Parker et al. | 264/53 X |
| 4,070,426 | 1/1978 | Purvis | 264/DIG. 5 |
| 4,101,532 | 7/1978 | Ruoti et al. | 525/433 |
| 4,180,536 | 12/1979 | Howell, Jr. et al. | 264/DIG. 5 |
| 4,183,822 | 1/1980 | Collington et al. | 264/DIG. 5 |
| 4,330,481 | 5/1982 | Timberlake et al. | 528/370 X |
| 4,344,903 | 8/1982 | Pascourt | 264/DIG. 5 |
| 4,413,065 | 11/1983 | Hall et al. | 264/DIG. 5 |
| 4,415,502 | 11/1983 | Timberlake et al. | 528/370 X |

OTHER PUBLICATIONS

*Kirk–Othmer Encyclopedia of Chemical Technology,* Third Edition, vol. 9, New York, John Wiley & Sons, ©1980, pp. 439, 466 and 468.

*Kirk–Othmer Encyclopedia of Chemical Technology,* Third Edition, vol. 11, New York, John Wiley & Sons, ©1980, pp. 935–937.

*The Condensed Chemical Dictionary,* Tenth Edition, Revised by Gessner G. Hawley, New York, Van Nostrand Reinhold, ©1981, p. 430.

*Primary Examiner*—Philip Anderson
*Attorney, Agent, or Firm*—John F. Stevens; Daniel B. Reece, III

[57] ABSTRACT

A new process for foaming cellulose acetate rods consists of blending the cellulose acetate with a suitable plasticizer, a nucleating agent, cyclic ethylene carbonate, and a co-reactant for the ethylene carbonate and extruding into a foamed rod. Suitable co-reactants include aromatic diol polyesters, polycarbonates, and poly(ester-carbonates) and monomeric or polymeric materials containing the

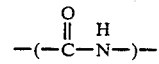

group, which have melting or flow points of less than about 250° C.

7 Claims, 1 Drawing Figure

PROCESS FOR FOAMING CELLULOSE ACETATE ROD

TECHNICAL FIELD

This invention relates to a process for preparing foamed cigarette filter rod of cellulose acetate. In particular, the invention relates to a process for preparing foamed cellulose acetate cigarette filter rod by extruding a physical blend of cellulose acetate, plasticizer, nucleating agent, ethylene carbonate, and certain monomeric and polymeric materials which are reactive toward ethylene carbonate.

BACKGROUND OF THE INVENTION

The unique combination of properties found in cellulose acetate, namely toughness, high impact strength, low flammability and ease of fabrication, have established its use in such areas as the coating, photographic and molding industries. Open or connected cell, foamed cellulose acetate structures are required in filters, e.g. cigarette filters, air filters for gasoline combustion engines, or in sponges or in any other article requiring an intercommunicating pore structure.

Polyolefin open cell structures having a peripheral skin are known, such structures being disclosed in U.S. Pat. Nos. 3,939,849 and 4,054,550. The polyolefin open cell structure is further characterized as a reticular structure wherein individual cells are bridged by fiber-like elements. Polyolefin foams when used in cigarette filter applications function by means of physical filtering alone; that is to say, mechanically trapping smoke-entrained matter. A major reason for the universal acceptance of cellulose acetate cigarette filters is the consumer acceptability of the taste imparted to the tobacco smoke stream as well as the ability to chemically sequester constituents from smoke vapor as well as mechanically trapping smoke-entrained matter, e.g. tarry substances.

Commercial cellulose acetate cigarette filters are high density filters (from about 0.14 to 0.15 grams per cubic centimeter) prepared from cellulose acetate tow. The manufacture of filter rods from tow is an expensive process involving manufacture of tow, opening of the tow bundle, precision topical application of plasticizer, forming the opened tow bundle into a rod, wrapping and gluing the rod and cutting the rod into suitable lengths.

U.S. Pat. No. 3,574,803 discloses a process for producing cellulose acetate structures. This process comprises mixing ripened cellulose acetate dope with a suitable diluent to its incipient precipitation point, dissolving an inert gas under pressure in the diluted cellulose acetate dope, precipitating the cellulose acetate from the gas-containing dope solution, and reducing the pressure on the mixture thereby allowing the gas to expand and escape and the cellulose acetate to foam. The foamed solid structure may then be washed and dried by conventional means.

U.S. Pat. No. 4,180,536 discloses that a low density open cell foamed cellulose acetate cigarette filter may be obtained by means of a process comprising melt extruding, through an extruder equipped with an eliptical or circular die, into a temperature conditioned atmosphere, a mixture of cellulose acetate, plasticizer, blowing agent and nucleating agent. The presence of a plasticizer is found to lower the glass transition temperature of cellulose acetate and make melt extrusion of a foamed cellulose acetate possible without undesirable thermal degradation of the polymer.

DISCLOSURE OF THE INVENTION

Figure 1:
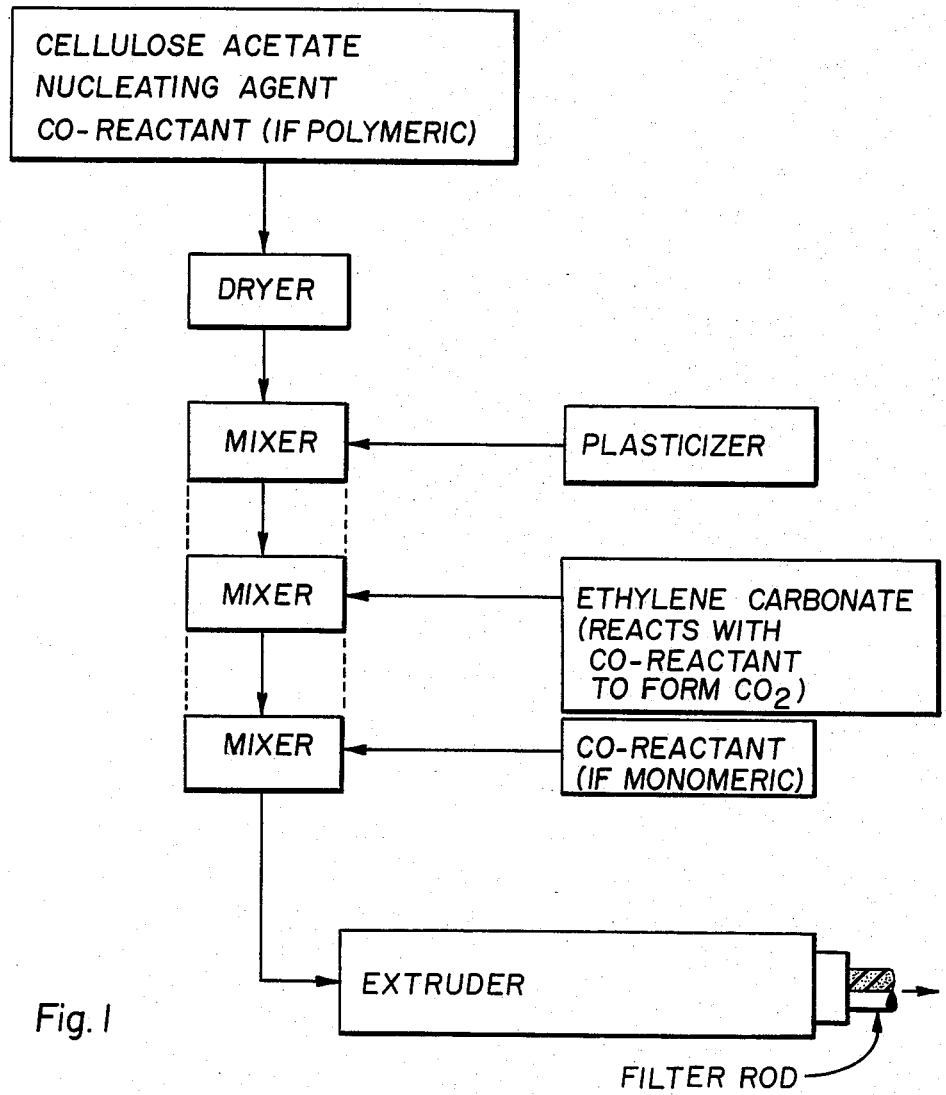
FIG. 1 is a flow diagram illustrating the process of this invention.

In accordance with the present invention, there is provided a process for producing a foamed, open cell filter rod which comprises extruding a molten composition at a temperature of about 220°–260° C. through an orifice of a screw extruder. The composition comprises (a) cellulose acetate having an acetyl content of about 36–44% (preferably 38–41%), and a ball drop viscosity of about 10–38 (preferably greater than 20) seconds, (b) about 3–10% (preferably 4–8%), based on the weight of the composition, of a non-volatile plasticizer for the cellulose acetate, (c) about 0.1–5% (preferably about 0.5–3%), based on the weight of the composition, of a nucleating agent, (d) about 2–10% (preferably about 4–8%), based on the weight of the composition, of cyclic ethylene carbonate, and (e) about 3–25% (preferably about 5–20%), based on the weight of the composition, of a substance which will react with said ethylene carbonate under extrusion conditions to produce carbon dioxide.

Several cellulose acetates having acetyl contents of about 36–44% and ball drop viscosities of about 10–38 seconds are commercially available. For example, CA-398-10 and CA-398-30, products marketed by Eastman Chemical Products, Inc. fall within this description. Acetyl content is measured according to ASTM D817 and ball drop viscosity is measured according to ASTM D-1343-69.

The plasticizers which may be used in the process of the invention include all plasticizers for cellulose acetate which are substantially nonvolatile during the process. Examples of such plasticizers are glyceryl triacetate (triacetin), triethylene glycol diacetate, and di-2-methoxyethyl phthalate. Triacetin is the preferred plasticizer.

The nucleating agent is added to the blend to reduce the size and increase the number of cells or bubbles in the foamed rod. The amount of nucleating agent may vary from about 0.1–5 wt. % or more, but 0.5–3 wt. % is preferred. It is preferred that the nucleating agent be a finely-divided powder, but not so finely-divided that the melt viscosity of the blend is appreciably increased during extrusion. About 300-mesh powder is adequate. Examples of nucleating agents are talc, titanium dioxide, and silica. Talc is the preferred nucleating agent.

The ethylene carbonate used in the process of the invention should be reasonably pure and preferably dry. The ethylene carbonate content of the blends used in the process of this invention may vary from about 2 to about 10 wt. %, depending on the desired degree of foaming, the plasticizer content of the blend, and the temperature of extrusion. The preferred ethylene carbonate content is about 4 to 8 wt. %.

The co-reactants for the ethylene carbonate may be aromatic diol polyesters, polycarbonates, poly(estercarbonates), or monomeric or polymeric materials containing the

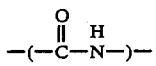

group, which have melting or flow points of less than about 250° C. Examples of such co-reactants are polytere/isophthalates of bisphenol A, bisphenol A polycarbonate, polyterephthalate/carbonates of bisphenol A, acetamide, urea, benzamide, and polycaprolactam (nylon 6). Bisphenol A is identified as 4,4'-isopropylidenediphenol. About 3–25 wt. % of these co-reactants may be used in the process of the invention, but about 5–20 wt. % are preferred. Generally, higher levels of the polymeric co-reactants may be used than that of the monomeric co-reactants. Too high a level of monomeric co-reactant can overplasticize the blend and cause collapsing of the cells in the foamed rod.

The blend used in the process of the invention may be prepared by a number of methods. It is important, however, that the blends be uniform, be reasonably dry, and be prepared in such a way that the ethylene carbonate and co-reactant do not contact each other at elevated temperature (>150° C.) before the actual extrusion foaming process. A satisfactory procedure for the preparation of the blends used in the process of the invention is shown diagrammatically in FIG. 1 and involves (1) predrying the nonvolatile ingredients of the blend [cellulose acetate, nucleating agent, co-reactant (if polymeric)] at about 100° C. and ≦0.5 torr for 15–20 hours, (2) transferring said dried blend to a preheated (∼80° C.) mixer container (such as that of a Hobart mixer) containing an inert gas, (3) adding the ethylene carbonate and stirring to "melt-coat" the blend, (4) adding and blending in the plasticizer, and (5) adding and mixing the co-reactant into the blend, if the co-reactant is volatile (monomeric). The mixer is usually allowed to cool to 40° C. or less (after the ethylene carbonate addition) before the other blend ingredients are added as described above.

A single mixer (indicated by dotted lines in the drawing) may be used for the addition of the plasticizer, ethylene carbonate, and co-reactant (if monomeric). On the other hand, separate mixers may be used for these additions.

The process of the invention is carried out by melt extruding a physical blend of cellulose acetate, a plasticizer for the cellulose acetate, a nucleating agent, cyclic ethylene carbonate, and a co-reactant (earlier described) in an extruder through a circular orifice (usually ⅛ inch) at about 220°–260° C. (preferably about 230°–250° C.). The foamed cellulose acetate rods have relative densities of ≦0.5 (preferably ≦0.3) and have utility as cigarette filters. The extrusion is usually carried out in an unvented, single-screw extruder which preferably has several individually-controlled temperature zones and a separately-controlled nozzle or orifice. Other types of extruders may be used so long as the gas required for foaming does not escape prematurely and-/or the cellulose acetate is not degraded. The orifice or nozzle temperature is kept appreciably cooler than the temperature of the other zones of the extruder to facilitate the formation of a "skin" on the rod and prevent collapse of the foamed rod. The extruder temperatures vary within the range of 220°–260° C., depending on the plasticizer content, ethylene carbonate content, molecular weight of the cellulose acetate, and amount and type (monomeric or polymeric) of co-reactant. The orifice temperature is preferably less than about 200° C.

The following examples are submitted for a better understanding of the invention.

In the examples, the densities of the foamed rods are determined by cutting off a section of the rod (cut perpendicularly to the axis of the rod), determining the sample weight (w) (grams), measuring the exterior dimensions of the sample (diameter and length), calculating the volume (v), and calculating the density (g/cm$^3$) as w/v. The relative densities are calculated as the quotient of the density/1.3. [The density of cellulose acatate (∼40% acetyl) is 1.3]. The extrusions are carried out in a 1.9-cm, single-screw, unvented Brabender extruder (L/D=20/1) having three individually-controlled temperature zones and a nozzle (⅛-inch circular orifice), also individually controlled. The rods are extruded onto a variable-speed belt maintained at about 25° C.

The inherent viscosity of the nylon 6 is determined at 25° C. in a 60/40 mixture (by weight) of phenol/1,1,2,2-tetrachloroethane at a concentration of 0.5 g/100 mL. The inherent viscosity of the bisphenol A polycarbonate is determined at 25° C. in a 40/36/24 weight mixture of p-chlorophenol/phenol/1,1,2,2-tetrachloroethane at a concentration of 0.1 g/100 g.

EXAMPLE 1

This example illustrates the foaming of cellulose acetate rod with ethylene carbonate and nylon 6 as co-reactants.

The following ingredients are dried at 100° C./18 hr./0.5 torr. in a vacuum oven:

1350.7 g. cellulose acetate powder, 39.8% acetyl, 30 sec. ball drop viscosity.

11.35 g. (0.5 wt. %) talc, powder ∼300 mesh.

567.5 g. (25 wt. %) nylon 6, I.V. 0.99, pulverized through a 2-mm screen using liquid nitrogen (actual particle size 60–80 mesh).

The above dried ingredients are transferred while hot to a 11.35 l. Hobart mixer container (preheated to ∼80° C.) blanketed with argon and 113.5 g. (5 wt. %) of granular, distilled cyclic ethylene carbonate is quickly added. The mixture is stirred under argon as the powder blend and mixer container cool slowly during about one hour. At this time, the mixer is stopped, 227.0 g. (10%) glyceryl triacetate (triacetin) is added, and mixing is again begun. After 30 minutes of additional mixing, the powder blend is transferred to glass containers and sealed under argon until extrusion.

The blend is extruded into foamed rod in a 1.9-cm., single-screw, unvented extruder (L/D: 20/1) at 80 rpm, zones 1, 2, and 3 at 190° C., 250° C., and 240° C., respectively, and the nozzle at 190° C. The light-tan rod is highly foamed, has a thin, slightly-wrinkled skin, and has an open-celled structure. The rod has a calculated relative density of 0.12.

EXAMPLE 2

This example illustrates the foaming of cellulose acetate rod with ethylene carbonate and bisphenol A polycarbonate as co-reactants.

The procedure of Example 1 is used to prepare 2.3 kg of a blend having the following composition:

60.5 wt. % cellulose acetate, 39.8% acetyl, ball drop viscosity: 37 sec.

0.5 wt. % talc, powder.

25.0 wt. % bisphenol A polycarbonate, I.V. 0.52, ~60–80 mesh.

7.0 wt. % triacetin.

7.0 wt. % ethylene carbonate.

The above blend is extruded into foamed rod in the same extruder as that utilized in Example 1, except at 100 rpm and at 195°, 250°, and 235°, and 185° C., respectively, for zones 1, 2, and 3 and the nozzle. The slightly off-white rod has a glossy surface, is moderately to highly foamed, and has a moderately open-celled structure. The rod has a calculated relative density of 0.28.

EXAMPLE 3

This example illustrates the foaming of cellulose acetate rod with ethylene carbonate and a monomeric amide as co-reactants.

The procedure of Example 1 is slightly modified and used to prepare 2.3 kg of blend having the following composition:

82.8 wt. % cellulose acetate, 39.8% acetyl, ball drop viscosity: 37 sec.

0.5 wt. % talc powder.

5.0 wt. % ethylene carbonate.

5.0 wt. % triacetin.

6.7 wt. % acetamide.

The slight modification of the Example 1 procedure involves deleting the nylon 6 powder from the initially-dried blend and adding the acetamide as the last ingredient during the blending procedure. The blend is extruded into foamed rod using the same extruder as that used in Example 1. The conditions are: 100 rpm, 185°, 245°, and 235° C. for zones 1, 2, and 3, respectively, and 185° C. on the extruder nozzle. The light yellow-tan rod has a smooth surface and an open-celled, highly-foamed structure. Its relative density is calculated to be 0.24.

Unless otherwise indicated, all parts, percentages, ratios, etc., are by weight.

The invention has been described in detail with particular reference to preferred embodiments thereof, but it will be understood that variations and modifications can be effected within the spirit and scope of the invention.

We claim:

1. A process for producing a foamed, open cell filter rod which comprises extruding a molten composition at a temperature of about 220°–260° C. through an orifice of a screw extruder, said composition comprising
   (a) cellulose acetate having an acetyl content of about 36–44% and a ball drop viscosity of about 10–38 sec.,
   (b) about 3–10%, based on the weight of the composition, of a non-volatile plasticizer for said cellulose acetate,
   (c) about 0.1–5%, based on the weight of the composition, of a nucleating agent,
   (d) about 2–10%, based on the weight of the composition, of cyclic ethylene carbonate, and
   (e) about 3–25%, based on the weight of the composition, of a substance which will react with said ethylene carbonate under extrusion conditions to produce carbon dioxide, said substance having a melting or flow point of less than about 250° C.

2. A process according to claim 1 in which said cellulose acetate has an acetyl content of about 38–41%.

3. A process according to claim 1 wherein said composition comprises
   (a) cellulose acetate,
   (b) about 4–8%, based on the weight of the composition, of a nonvolatile plasticizer for said cellulose acetate,
   (c) about 0.5–3%, based on the weight of the composition, of a nucleating agent,
   (d) about 4–8%, based on the weight of the composition, of cyclic ethylene carbonate, and
   (e) about 5–20%, based on the weight of the composition, of a substance which will react with said ethylene carbonate under extrusion conditions to produce carbon dioxide, said substance having a melting or flow point of less than about 250° C.

4. A process according to claim 1 wherein said plasticizer is selected from the group consisting of triacetin, triethylene glycol diacetate and di-2-methoxyethyl phthalate.

5. A process according to claim 1 wherein said nucleating agent is selected from the group consisting of talc, titanium dioxide, and silica.

6. A process according to claim 1 wherein co-reactant for ethylene carbonate is selected from the group consisting of aromatic diol polyesters, polycarbonates, poly(ester-carbonates) and monomeric or polymeric materials containing the

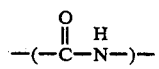

group.

7. A process according to claim 6 wherein said co-reactant is selected from the group consisting of copolyesters of terephthalic and isophthalic acid and bisphenol A, bisphenol A polycarbonate, copolymers of terephthalic and carbonic acid with bisphenol A, acetamide, urea, benzamide and polycaprolactam.

* * * * *